C. D. SHAW.
SELF TIGHTENING BEARING.
APPLICATION FILED JULY 5, 1911.
1,038,006.
Patented Sept. 10, 1912.
2 SHEETS—SHEET 1.
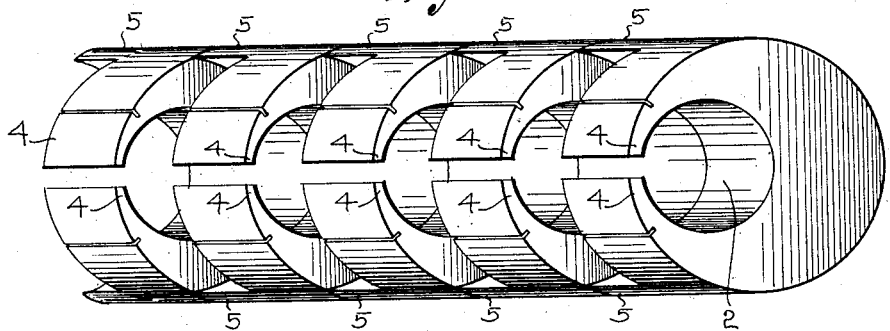
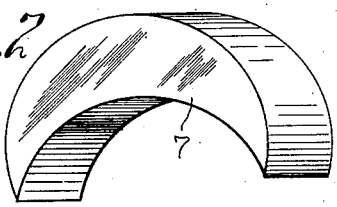
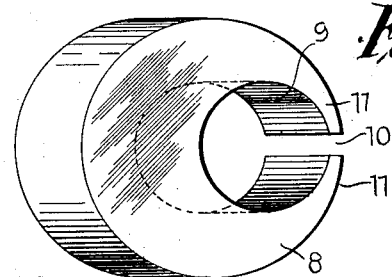
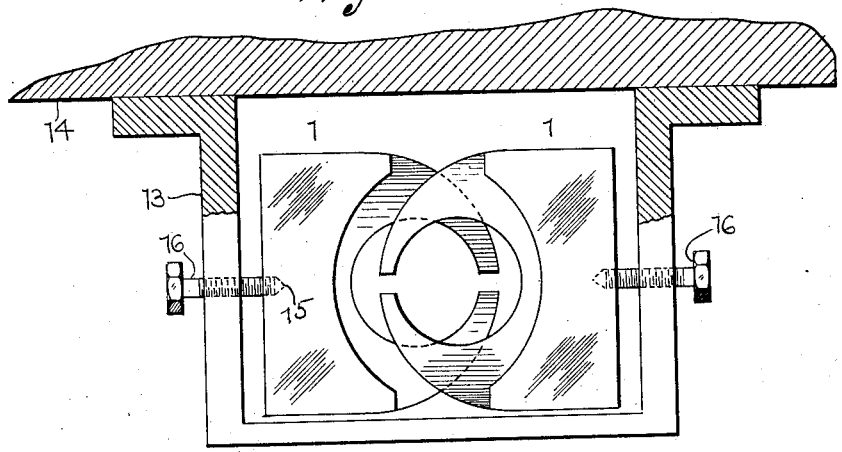
WITNESSES
Robert M. Sutphen
E. W. Cady
INVENTOR
Charles D. Shaw.
By C. C. Vrooman
his Attorney

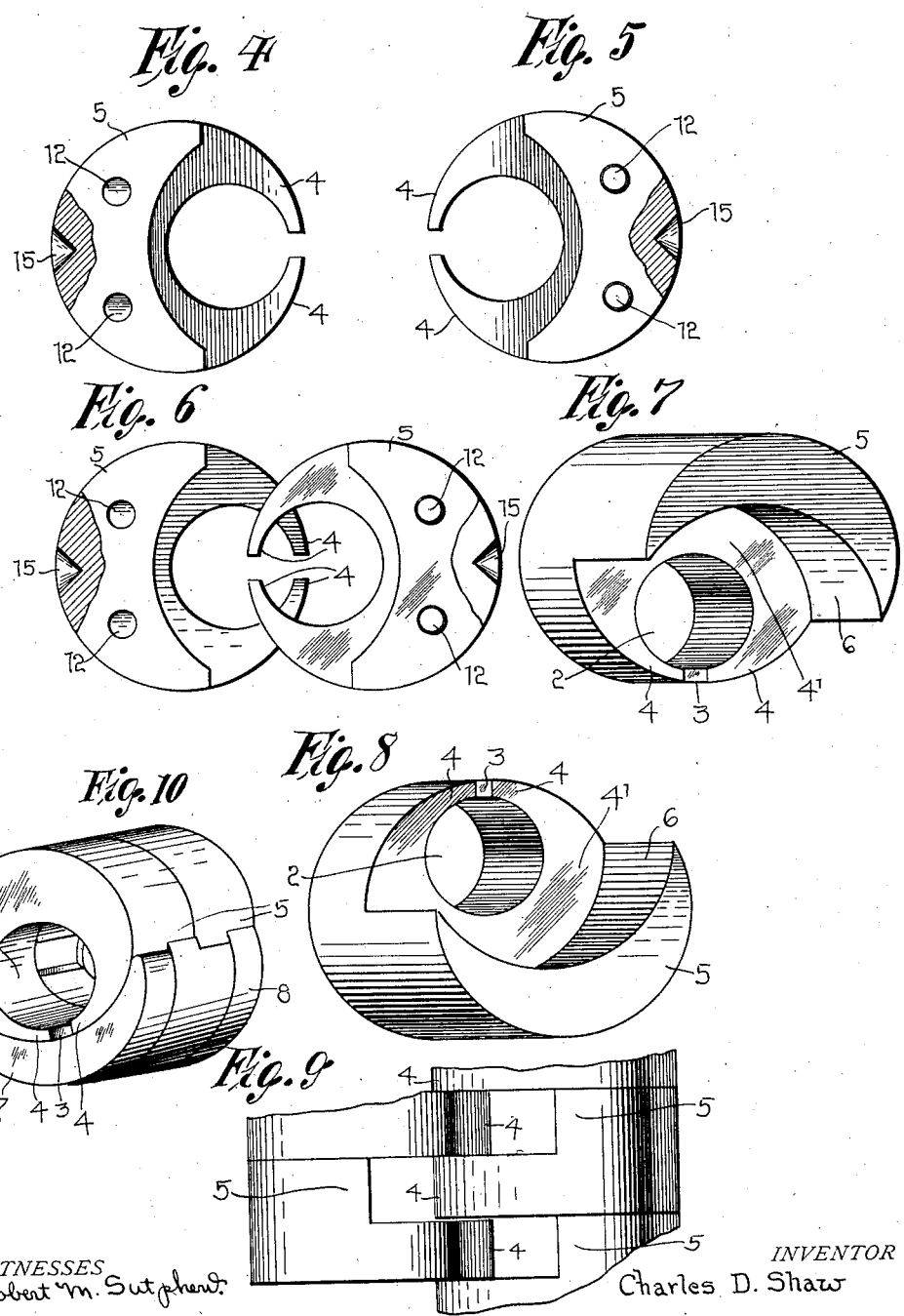

UNITED STATES PATENT OFFICE.

CHARLES D. SHAW, OF DETROIT, MICHIGAN.

SELF-TIGHTENING BEARING.

1,038,006.   Specification of Letters Patent.   Patented Sept. 10, 1912.

Application filed July 5, 1911. Serial No. 636,895.

*To all whom it may concern:*

Be it known that I, CHARLES D. SHAW, a citizen of the United States, residing at Detroit, in the county of Wayne and State of Michigan, have invented certain new and useful Improvements in Self-Tightening Bearings, of which the following is a specification, reference being had therein to the accompanying drawing.

This invention relates to shaft bearings and has especial reference to that class of shaft bearings which are formed in sections adapted to be placed over a shaft and secured together.

The invention has for its object to provide an improved shaft bearing of this kind which may be readily assembled and adjusted to take up wear.

With these and other objects in view the invention consists of certain novel constructions, combinations, and arrangements of parts as hereinafter described and claimed.

Referring to the accompanying drawings:—Figure 1 is a view in perspective of one form of one of the members of a shaft bearing constructed in accordance with this invention. Fig. 2 is a view in perspective of a crescent shaped member employed in assembling one form of the shaft bearing constructed in accordance with this invention. Fig. 3 is a detail view in perspective of a cylindrical section employed in assembling the shaft bearing constructed in accordance with this invention. Fig. 4 and Fig. 5 are detail views of sections shown as partly broken away, employed in assembling a bearing constructed in accordance with this invention. Fig. 6 is a view of the sections shown in Figs. 4 and 5 showing them in overlapping relation before being assembled together. Figs. 7 and 8 are enlarged detail views in perspective of the sections shown in Figs. 4 and 5. Fig. 9 is a side view of the sections shown in Figs. 7 and 8 in overlapping relation to each other. Fig. 10 is a detail view in perspective of a shaft bearing constructed in accordance with this invention. Fig. 11 is an enlarged detail view partly in section of a casing mounted on a support and inclosing adjustable members forming a shaft bearing constructed in accordance with this invention.

The shaft bearing constructed in accordance with this invention is formed of two members each provided with a number of sections assembled together, some of said sections being of different shape. In assembling the bearing constructed in accordance with this invention sections 1 are employed as shown in the several figures, each of said sections consisting of a cylindrical member formed with a transverse eccentric hole 2 having a longitudinal slot 3 at one side thereof forming tapered, crescent shaped horns 4 and a curved seat 4' in the rear of said horns and with a crescent shaped projection 5 extending beyond the rear edge of said seat 4'.

In assembling the parts, the sections 1 are fitted together so that the horns 4 of one section will rest on the horns 4 of the next section, each of said pairs of horns being seated against the curved surface 6 of the crescent shaped extension 5. In conjunction with the sections 1 there are employed in the assembling of the parts of the bearing crescent shaped members 7 and circular sections 8 having an eccentric hole 9 with a vertical slot 10 in its wall forming crescent shaped horns 11. In Fig. 1 is shown one form of one of the built up members of the bearing made up of the sections 1 the parts being held together in any suitable manner as for example by means of holes 12 in each of the sections except the end section and through which extend binding pins.

By means of the several sections set forth a bearing of any length may be formed comprising two members each constructed as shown in Fig. 1, the two members being placed together in interlocking relation to each other so that their holes 2 form a continuous passage way for a shaft. In building up the members of the bearing the sections 7 and 8 may be employed as fillers with the sections 1, the sections 7 and 8 when fastened together by pins being the same shape as a section 1.

In Fig. 10 a bearing is shown built up of the sections 1, 7, and 8 hereinbefore described.

In Fig. 11 there is shown a casing 13 secured to a support 14 and located in said casing are sections constructed in accordance with this invention in overlapping relation to each other, each of said sections having a recess 15 in its rear wall in which is seated the end of a set screw 16 mounted in the wall of the casing 13. By means of the set screw 16 the sections 1 may be adjusted in relation to each other so as to enlarge or decrease the openings through which the shaft is to pass.

What I claim is:—

1. A shaft bearing formed from a number of sections assembled together in interlocking relation to each other, each of said sections being of a circular shape and formed with a pair of crescent shaped horns, and a lateral crescent shaped projection extending from the rear of said horns.

2. A shaft bearing formed of two members, each comprising a number of sections assembled together, each of said sections being of a circular shape, and having a pair of crescent shaped horns, and a crescent shaped projection extending from the rear of said horns, the several sections of one of said members interlocking with the several sections of the other member.

3. A shaft bearing consisting of two members interlocked together, one of said members consisting of a number of circular shaped sections each formed with crescent shaped arms and a crescent shaped projection extending from the rear of said arms; the other section consisting of a circular shaped member formed with crescent shaped arms, and sections of a crescent shape, the several sections of one member interlocking with the sections of the other member.

4. A shaft bearing formed of a number of sections assembled together in interlocking relation to each other, several of said sections being in the shape of a circular block formed with a pair of crescent shaped horns, and a lateral crescent shaped projection extending from the rear of said horns, other sections each consisting of a circular shaped block formed with crescent shaped horns, and other sections each consisting of a block in the form of a crescent.

In testimony whereof I hereunto affix my signature in presence of two witnesses.

CHARLES D. SHAW.

Witnesses:
HARRY TEUNIS,
EDWARD J. DIEDRICH.

Copies of this patent may be obtained for five cents each, by addressing the "Commissioner of Patents, Washington, D. C."